US010805286B2

(12) United States Patent
Trahe et al.

(10) Patent No.: US 10,805,286 B2
(45) Date of Patent: Oct. 13, 2020

(54) MIRRORED COMMUNICATION DEVICES IN CARRIER NETWORKS

(71) Applicant: Intel Corporation, Santa Clara, CA (US)

(72) Inventors: Fiona Trahe, Clarecastle (IE); Jessica C. McCarthy, Dublin (IE); Ana Sanz Carretero, Dublin (IE); Chiara Cavarra, Dublin (IE); Annie Ibrahim Rana, Dublin (IE)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 15/280,993

(22) Filed: Sep. 29, 2016

(65) Prior Publication Data

US 2018/0091501 A1    Mar. 29, 2018

(51) Int. Cl.
| H04L 29/06 | (2006.01) |
| H04B 1/3816 | (2015.01) |
| H04W 8/00 | (2009.01) |
| H04L 9/32 | (2006.01) |
| H04W 12/06 | (2009.01) |

(Continued)

(52) U.S. Cl.
CPC ....... H04L 63/0853 (2013.01); H04B 1/3816 (2013.01); H04L 9/3226 (2013.01); H04W 8/005 (2013.01); H04W 12/0608 (2019.01); H04W 12/0609 (2019.01); H04L 63/061 (2013.01); H04L 2209/805 (2013.01); H04W 4/60 (2018.02); H04W 4/80 (2018.02)

(58) Field of Classification Search
CPC ............. H04L 2209/805; H04L 63/061; H04L 63/0853; H04L 9/3226; H04L 61/106; H04W 12/06; H04W 4/60; H04W 4/80; H04W 8/005; H04W 68/005; H04W 8/18; H04W 8/205

See application file for complete search history.

(56) References Cited

U.S. PATENT DOCUMENTS 8,073,923 B2 * 12/2011 Sasaki ..................... A63F 13/12
                                                                709/209
8,711,656 B1 * 4/2014 Paulson ............... H04B 5/0031
                                                                367/135

(Continued)

*Primary Examiner* — Joseph P Hirl
*Assistant Examiner* — Sayed Aresh Beheshti Shirazi
(74) *Attorney, Agent, or Firm* — Schwabe, Williamson & Wyatt, P.C.

(57) ABSTRACT

In some embodiments, an apparatus includes one or more communication sub-systems; and an identity mirror component in communication with the one or more communication sub-systems. In response to selection, on an another device, of the apparatus from among a plurality of devices, receive, from the another device, carrier user identity information and carrier authentication key information associated with the carrier user identity information. Cause the one or more communication sub-systems to connect to a carrier network using the carrier user identity information and the carrier authentication key information, wherein to connect to the carrier network is conditioned on the another device being disconnected from the carrier network and the another device is to retain the carrier user identity information and the carrier authentication key information in an Internet protocol (IP) multimedia services identity module (ISIM).

12 Claims, 9 Drawing Sheets

(51) Int. Cl.
  *H04W 4/80* (2018.01)
  *H04W 4/60* (2018.01)

(56) References Cited

U.S. PATENT DOCUMENTS

| | | | |
|---|---|---|---|
| 8,768,251 B2* | 7/2014 | Claus | H04W 12/06 |
| | | | 455/41.2 |
| 2012/0052802 A1* | 3/2012 | Kasslin | H04W 48/12 |
| | | | 455/41.2 |
| 2014/0189827 A1* | 7/2014 | Popovich | H04L 63/08 |
| | | | 726/6 |
| 2015/0180837 A1* | 6/2015 | Ryu | H04L 63/062 |
| | | | 713/171 |
| 2016/0050557 A1* | 2/2016 | Park | H04W 8/205 |
| | | | 455/419 |
| 2016/0057619 A1* | 2/2016 | Lopez | G06Q 20/3825 |
| | | | 380/247 |
| 2016/0285843 A1* | 9/2016 | Popovich | H04L 63/102 |
| 2016/0286043 A1* | 9/2016 | John | H04L 65/1069 |
| 2017/0048645 A1* | 2/2017 | Yerrabommanahalli | |
| | | | H04W 8/205 |
| 2018/0054249 A1* | 2/2018 | Khanukaev | H04B 1/3838 |
| 2018/0098216 A1* | 4/2018 | Vincent | H04W 8/20 |

* cited by examiner

Non-transitory computer-readable storage medium
702

Programming Instructions 704
configured to cause a computer device, in response to execution of the programming instructions, to practice one or more operations of the methods described in reference to Figures 1-5.

FIG. 7

MIRRORED COMMUNICATION DEVICES IN CARRIER NETWORKS

FIELD OF THE INVENTION

The present disclosure relates generally to the technical fields of computing and communication, and more particularly, to computing systems for extending use of information associated with Internet protocol (IP) multimedia services identity modules (ISIMs) for communication purposes.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Mobile communication devices, such as smart phones, have proliferated in recent years with their capabilities also increasing over time. But as capabilities have increased, so have the size, price, and/or fragility of such mobile communication devices. While a person may wish to have access to his or her smart phone at all times, so that he/she may have ready access to voice calls or texts, for example, carrying around a smart phone may not be feasible and/or unadvised given the activity or environment surrounding the person at a given point in time. For example, if the person is engaging in a sport activity, such as kayaking, a smart phone exposed to such an environment may be damaged, permanently made inoperable, lost, and/or lack a place in which to be safely carried.

Even if a smaller and/or inexpensive device may be capable of communications such as voice calls or texts, a network carrier service account associated with such a device may be required. It may be difficult and/or cumbersome for a person to extend use of his/her network carrier service account associated with a smart phone to another device, such as a smaller and/or inexpensive device.

BRIEF DESCRIPTION OF THE DRAWINGS

Embodiments will be readily understood by the following detailed description in conjunction with the accompanying drawings. The concepts described herein are illustrated by way of example and not by way of limitation in the accompanying figures. For simplicity and clarity of illustration, elements illustrated in the figures are not necessarily drawn to scale. Where considered appropriate, like reference labels designate corresponding or analogous elements.

FIG. 7 illustrates an example non-transitory computer-readable storage media having instructions configured to practice all or selected ones of the operations associated with the processes described herein, according to some embodiments.

DETAILED DESCRIPTION

Figure 1:
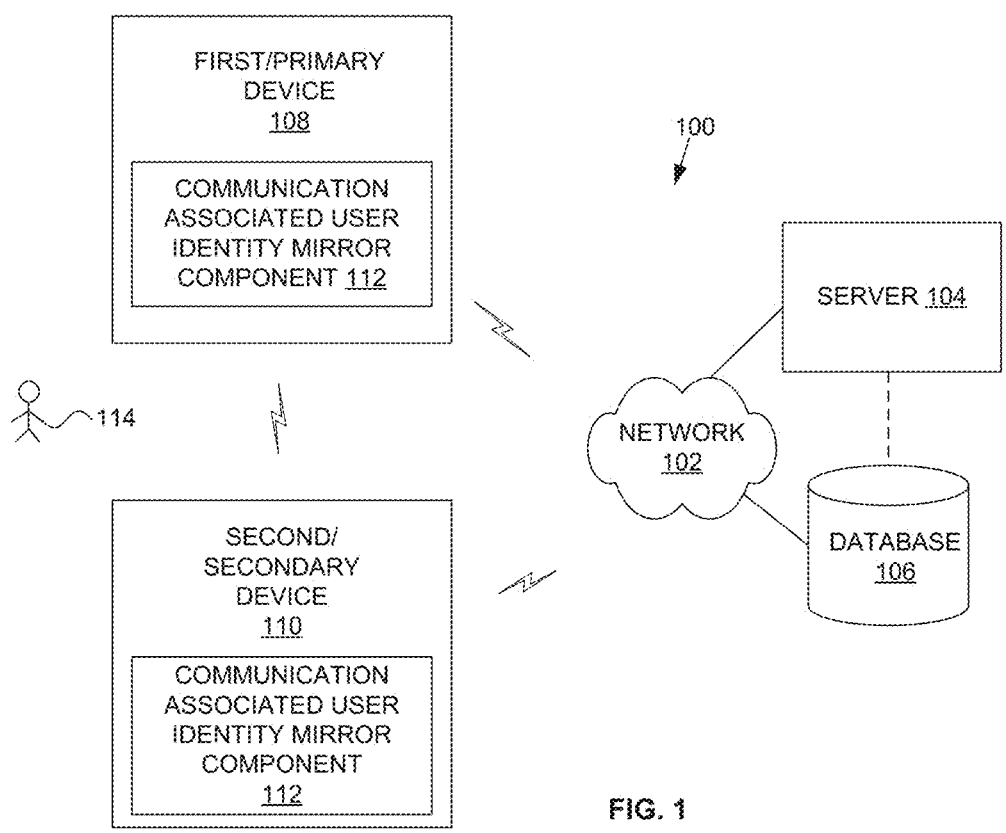
FIG. 1 depicts a block diagram illustrating a network view of an example system incorporated with the mirroring technology of the present disclosure, according to some embodiments.

Embodiments of apparatuses and methods related to implementing mirrored communication devices in a carrier network are described. In some embodiments, an apparatus may include one or more communication sub-systems; and an identity mirror component in communication with the one or more communication sub-systems. The identity mirror component may be to, in response to selection, on an another device, of the apparatus from among a plurality of devices, receive, from the another device, carrier user identity information and carrier authentication key information associated with the carrier user identity information; and cause the one or more communication sub-systems to connect to a carrier network using the carrier user identity information and the carrier authentication key information, wherein to connect to the carrier network is conditioned on the another device being disconnected from the carrier network and the another device is to retain the carrier user identity information and the carrier authentication key information in an Internet protocol (IP) multimedia services identity module (ISIM). These and other aspects of the present disclosure will be more fully described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B);

(C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 depicts a block diagram illustrating a network view of an example system 100 incorporated with the mirroring technology of the present disclosure, according to some embodiments. System 100 may include a network 102; a server 104; a database 106; a primary device 108; and a secondary device 110. Each of the server 104, database 106, primary device 108, and secondary device 110 may communicate with the network 102. Primary device 108 and second device 110 may be incorporated with the mirroring technology of the present disclosure to allow secondary device 110 to communicate assuming an identity associated with primary device 108, to be described more fully below.

Network 102 may comprise one or more wired and/or wireless communications networks. Network 102 may include one or more network elements (not shown) to physically and/or logically connect computer devices to exchange data with each other. In some embodiments, network 102 may be the Internet, a wide area network (WAN), a personal area network (PAN), a local area network (LAN), a campus area network (CAN), a metropolitan area network (MAN), a virtual local area network (VLAN), a cellular network, a carrier network, a WiFi network, a WiMax network, and/or the like. Additionally, in some embodiments, network 102 may be a private, public, and/or secure network, which may be used by a single entity (e.g., a business, school, government agency, household, person, and the like). Although not shown, network 102 may include, without limitation, servers, databases, switches, routers, gateways, base stations, repeaters, software, firmware, intermediating servers, and/or other components to facilitate communication.

Server 104 may comprise one or more computers, processors, cellular infrastructure, network infrastructure, back haul infrastructure, or servers to facilitate communication between and among primary device 108, secondary device 110, and a plurality of other devices (not shown). In some embodiments, server 104 may communicate with database 106 (directly or indirectly via network 102), primary device 108, and/or secondary device 110, via network 102. In some embodiments, server 104 may include one or more web servers, one or more application servers, one or more intermediating servers, and the like. In some embodiments, server 104 may comprise one or more communication components associated with one or more mobile network operators, mobile virtual network operators, wireless service providers, wireless carriers, cellular companies, and the like to facilitate long range wireless data, telephony, and/or Internet communications by the primary and/or secondary device 108, 110.

Database 106 may comprise one or more storage devices to store data and/or instructions for use by server 104, primary device 108, and/or secondary device 110. The content of database 106 may be accessed via network 102 and/or directly by the server 104. The content of database 106 may be arranged in a structured format to facilitate selective retrieval. In some embodiments, database 106 may comprise more than one database. In some embodiments, database 106 may be included within server 104.

Primary device 108 may comprise one or more wired and/or wireless communication computing devices in communication with server 104 (via network 102) and/or secondary device 110. Primary device 108 may also be referred to as a main device, first device, master device, or the like. Primary device 108 may comprise, without limitation, one or more work stations, personal computers, general purpose computers, laptops, Internet appliances, hand-held devices, wireless devices, Internet of Things (IoT) devices, wearable devices, set top boxes, appliances, vehicles, wired devices, portable or mobile devices, cellular or mobile phones, portable digital assistants (PDAs), smart phones, tablets, multi-processor systems, microprocessor-based or programmable consumer electronics, game consoles, set-top boxes, network PCs, mini-computers, and the like.

In some embodiments, primary device 108 may include user identity information, user identity authentication information (also referred to as authentication information, authentication key information, key information, and the like), and other information for interfacing/connecting/accessing one or more carrier networks and the like, to be described more fully below. In some embodiments, the user identity information may comprise an international mobile subscriber identity (IMSI) number and the authentication information may comprise the authentication key information associated with the IMSI number. In some embodiments, the user identity information and associated authentication information may comprise parameters included in an Internet protocol (IP) multimedia services identity module (ISIM) for identifying and authenticating a user 114 to an IP multimedia system or IP multimedia core network subsystem (IMS). In some embodiments, the ISIM may be included in fixed or removable hardware and/or firmware included in the primary device 108. For example, the user identity information, authentication information, and other information (which may be contained within the ISIM) may be included in a subscriber identity module (SIM), a SIM card, SIM circuitry, SIM chip, universal integrated circuit card (UICC), UICC card, UICC circuitry, UICC chip, universal subscriber identity module (USIM), USIM circuitry, USIM, chip, or the like.

Primary device 108 may also include hardware, firmware, circuitry, applications, software, and/or other executable instructions to facilitate various aspects of the techniques described herein. In some embodiments, primary device 108 may include a communication associated user identity mirror component 112 (also referred to as an identity mirror component). As described in detail below, the communication associated user identity mirror component 112 may be configured to securely and easily transfer or mirror user identity information associated with communication over network carrier infrastructure included in the primary device 108 to a different device, such as the secondary device 110, under control of a user, such as the user 114, without network carrier involvement and without cloning the user identity and authentication. The component 112 may also be configured to ensure carrier network access using the user identity information by only one device at a given time (e.g., either primary device 108 or secondary device 110). The component 112 may be further configured to facilitate use of the user identity information back on the primary device 108, under control of the user 114. And component 112 may also provide housekeeping functionalities associated with maintenance of the user identity information in more than one device.

Secondary device 110 may comprise one or more wired and/or wireless communication computing devices in communication with server 104 (via network 102) and/or primary device 108. Secondary device 110 may also be referred to as a second device, mirror device, slave device, auxiliary device, inexpensive device, robust device, or the like. Secondary device 110 may comprise, without limitation, one or more devices having fewer functionalities or features, smaller size, smaller form factor, less fragile, lower manufacturing cost, fewer components, and/or lower price than the primary device 108; Internet devices; hand-held devices; wireless devices; Internet of Things (IoT) devices; wearable devices; portable or mobile devices; cellular or mobile phones; and the like.

In some embodiments, secondary device 110 may include hardware, firmware, circuitry, applications, software, and/or other executable instructions to facilitate various aspects of the techniques described herein. In some embodiments, secondary device 110 may include the communication associated user identity mirror component 112, which may be further configured to facilitate receipt of the user identity and authentication information from the primary device 108, maintenance of the user identity and authentication information at the secondary device 110, use of the user identity and authentication information by the secondary device 110, and return of use of the user identity and authentication information to the primary device 108.

In some embodiments, primary device 108 may comprise a smart phone or a tablet that (normally) includes the user identity and associated authentication information in the ISIM, and the secondary device 110 may comprise a small, robust, and/or inexpensive device configured to mirror the primary device's 108 user identity and associated authentication information. Each of the primary and secondary devices 108, 110 may be capable of long range wireless communication (e.g., cellular communication) and short range wireless communication (e.g., Bluetooth) similar or compatible with each other. In some embodiments, primary and secondary devices 108, 110 may communicate with each other in association with component 112 via short range wireless communication; and the primary and secondary devices 108, 110 may be capable of phone calls, texts, or other typical carrier network communications via long range wireless communication.

In some embodiments, the secondary device 110 may be configured for a specific purpose, such as being waterproof for use in water sports, being small for use in activities such as jogging or running, and the like. Primary and secondary devices 108, 110 may both belong to and/or be under the control of the same user 114. Although not shown in FIG. 1, more than one secondary device 110 may be associated with primary device 108, in which the user identity and authentication information included in the primary device 108 may be transferred to and used by a particular one of the devices from among the primary device 108 and one or more of the secondary devices 110 at a particular point in time, in accordance with the user 114's direction, thereby allowing the particular secondary device 110 engage in long range communications "uninterrupted" from the primary device 108.

In some embodiments, the component 112 (or a portion thereof) may be implemented as software comprising one or more instructions to be executed by one or more processors included in respective primary device 108 and/or secondary device 110. In some embodiments, the one or more instructions comprising the component 112 may be stored and/or executed in a trusted execution environment (TEE) of respective primary device 108 and/or secondary device 110. In some embodiments, the TEE may be included in a dedicated core of respective primary device 108 and/or secondary device 110. In alternative embodiments, the component 112 (or a portion thereof) may be implemented as firmware or hardware such as, but not limited to, application specific integrated circuit (ASIC), programmable array logic (PAL), field programmable gate array (FPGA), and the like included in the respective primary device 108 and/or secondary device 110. In some embodiments, component 112 may be implemented as software in one of the primary device 108 or secondary device 110 and implemented as hardware in the other one of the primary device 108 or secondary device 110, or vice versa.

Figure 2:
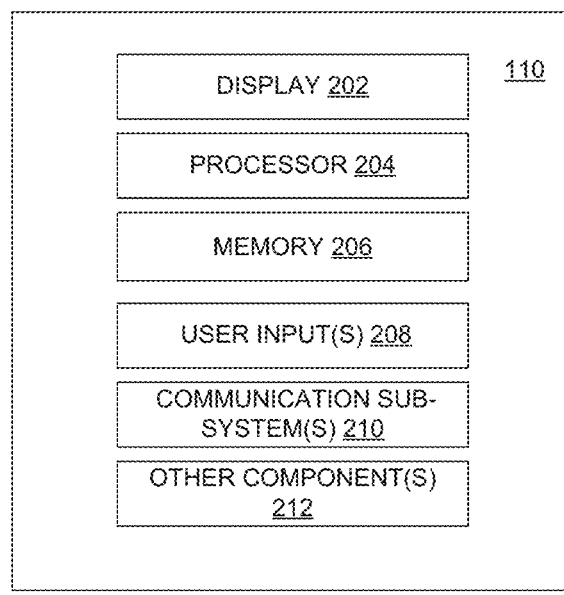
FIG. 2 depicts a block diagram of example components included in a secondary device, according to some embodiments.

FIG. 2 depicts a block diagram of example components included in the secondary device 110, according to some embodiments. In some embodiments, secondary device 110 may include, without limitation, a display 202, a processor 204, a memory 206, user input(s) 208, communication sub-system(s) 210, and other component(s) 212.

In some embodiments, display 202 may comprise a screen that is smaller than included in the primary device 108. Processor 204 may comprise one or more processors, each having one or more processor cores, configured to execute software included in memory 206. If component 112 is implemented at least in part in software, then memory 206 may include a portion or the entire software component 112, to be executed by the processor 204, to perform one or more of the techniques described herein. User input(s) 208 may comprise one or more physical and/or virtual user input mechanisms (e.g., buttons, switches, physical keypad, virtual keypad, physical keyboard, virtual keyboard, voice control or commands, etc.) appropriate for the form factor constraints of the secondary device 110. Communication sub-system(s) 210 may comprise one or more communication components (e.g., antennas, receivers, transmitters, transceivers, circuitry, controller, etc.) capable of short range communication (e.g., Bluetooth, WiFi) and long range communication (e.g., cellular).

Other component(s) 212 may comprise one or more components specific to the type of device of the secondary device 110. For example, if secondary device 110 includes radio functionalities, other component(s) 212 may include radio circuitry and antenna. As another example, if secondary device 110 provides image capture capabilities, other component(s) 212 may include a camera. In some embodiments, other component(s) 212 may comprise hardware configured to implement and/or is associated with the component 112. For example, other component(s) 212 may include the portion or the entirety of component 112 implemented in an ASIC, PAL, FPGA, circuitry, or the like. As another example, other component(s) 212 may include a TEE or a dedicated core to protectively execute the software portion of component 112. As still another example, other component(s) 212 may include a memory in which the component 112 may be stored as one or more instructions to be executed by one or more processors of the secondary device 110.

In some embodiments, the user identity information and authentication information included in the primary device 108 may be mirrored in the secondary device 110 via the component 112 that may be maintained in the memory 206. Alternatively, other component(s) 212 may include, for example, SIM, UICC, or USIM circuitry or other dedicated hardware and/or firmware to store and maintain the user identity information and authentication information transmitted from the primary device 108. In still other embodiments, information associated with secure handover and use of the user identity-related information between the primary and secondary devices 108, 110 may be stored in any component included in the secondary device 110.

Figure 3:
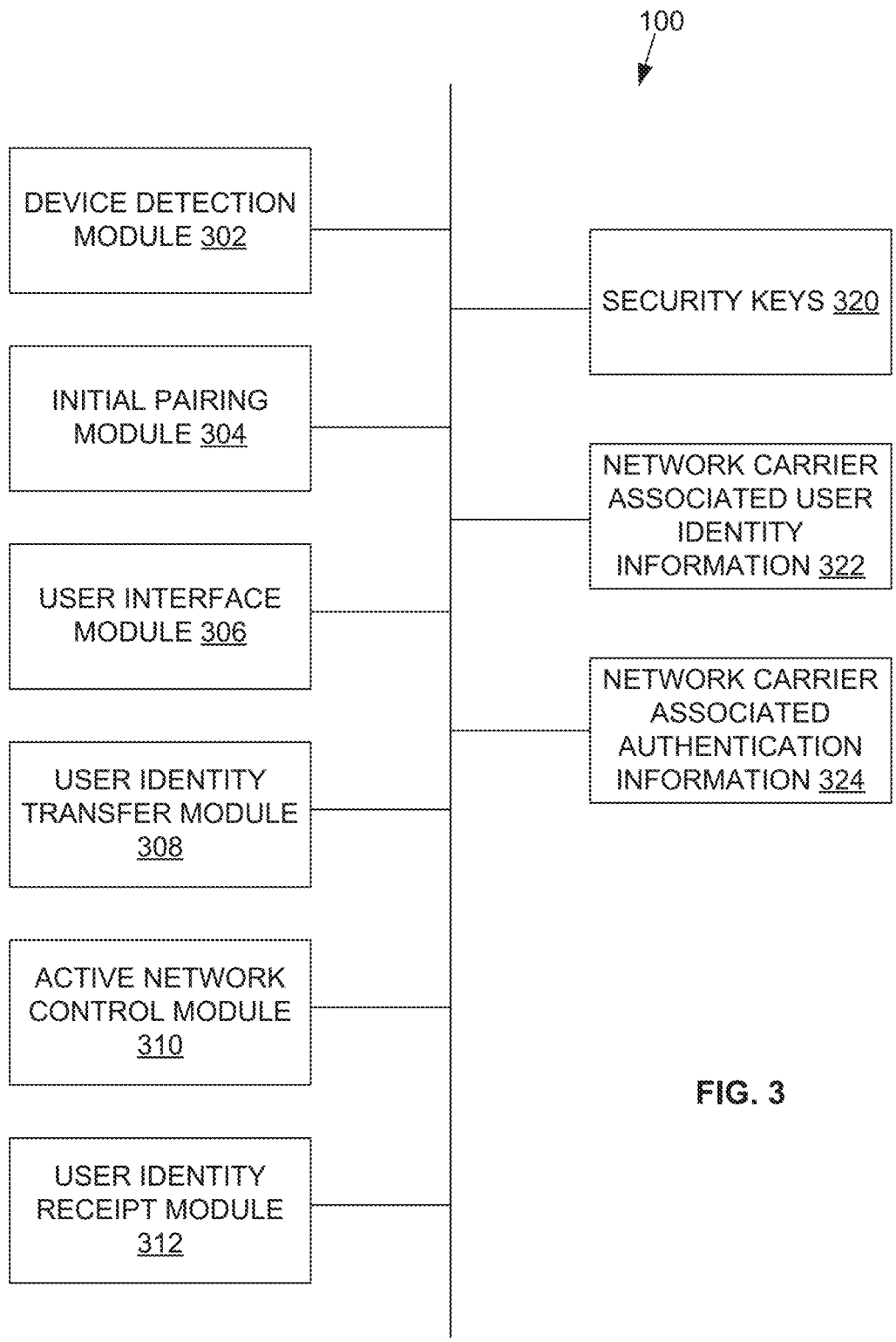
FIG. 3 depicts an example block diagram illustrating a logical view of the system of FIG. 1, the block diagram illustrating algorithmic structures and data associated with the processes performed by the algorithmic structures, according to some embodiments.

FIG. 3 depicts an example block diagram illustrating a logical view of the system 100, the block diagram illustrating algorithmic structures and data associated with the processes performed by the algorithmic structures, according to some embodiments. FIG. 3 illustrates example modules and data that may be included and/or used by the component 112 to selectively "share" and use network carrier-related user identity information from the primary device 108 in both the primary and secondary devices 108, 110, according to some embodiments. The various modules and/or data shown in FIG. 3 may be implemented at least partially by hardware at one or more computing devices, such as one or more hardware processors executing instructions stored in one or more memories for performing various functions described herein. The modules and/or data may be communicatively coupled (e.g., via appropriate interfaces) to each other and to various data sources, so as to allow information to be passed between the modules and/or to share and access common data. FIG. 3 illustrates only one of many possible arrangements of modules and data configured to perform the functionalities described herein. Other arrangements may include fewer or different modules and/or data, and the division of work between the modules and/or data may vary depending on the arrangement. In some embodiments, modules 302-312 may comprise one or more software components, programs, applications, or other units of code base or instructions configured to be executed by one or more processors, or may comprise one or more firmware or hardware components or circuitry, included in the primary device 108 and/or secondary device 110. Although modules 302-312 may be depicted as distinct components in FIG. 3, modules 302-312 may be implemented as fewer or more components than illustrated.

In some embodiments, device detection module 302 may be configured to cause the primary device 108 to detect the presence of nearby devices, such as secondary device 110. For each of one or more detected nearby devices indicated as of interest by the user 114, initial pairing module 304 may be configured to facilitate an initial pairing, handshake, configuration, or other preparation between the primary device 108 and the device of interest (e.g., secondary device 110). User interface module 306 may facilitate presentation and acceptance of one or more user inputs associated with the component 112. In some embodiments, initial pairing module 304 may facilitate generation and sharing of one or more security keys 320 between the primary device 108 and the device of interest. The security keys 320 may be subsequently used to encrypt and decrypt network carrier-related user identity information and other associated information shared from the primary device 108 to the device of interest. The security keys 320 between a given pair of the primary device 108 and device of interest pair may be unique from security keys 320 for another pair of the primary device 108 and a device of interest, in some embodiments.

Once the initialization process is complete, user identity transfer module 308 may be configured to transfer, share, or otherwise provide network carrier-related user identity information included in the primary device 108 to the device of interest, without, for example, removing the SIM card from the primary device 108 and inserting into the device of interest. The network carrier-related user identity information may be appropriately encrypted prior to transmission and decrypted after receipt. In some embodiments, the carrier network-related user identity information may comprise network carrier associated user identity information 322 (e.g., IMSI number) and network carrier associated authentication key information 324 (e.g., authentication key $K_1$).

Active network control module 310 may be configured to ensure that only a particular device authorized to use the network carrier-related user identity information associated with the primary device 108 may be active on the carrier network (e.g., a cellular network) at any given time. For instance, although primary device 108 retains its SIM card after sharing network carrier-related user identity information with the secondary device 110, and accordingly, have user identity information sufficient to connect to the carrier network after sharing, active network control module 310 may cause primary device 108 to disconnect from the carrier network prior to the secondary device 110 connecting to the carrier network. And furthermore, prevent the primary device 108 from reconnecting with the carrier network until the user 114 requests handover or control back from the secondary device 110 to the primary device 108.

User identity receipt module 312 may be configured to facilitate receipt of the network carrier-related user identity information from the primary device 108 to the secondary device 110, and to handle decryption, storage, and other associated functions for the secondary device 110 to connect to the carrier network.

In some embodiments, all of modules 302-312 may be included in each of the primary and secondary devices 108, 110, with one or more of certain of modules 302-312 being inactive, inert, or inactivated in a particular device. For example, the user identity transfer module 308 may exist in both the primary and secondary devices 108, 110 but may be active in only the primary device 108 (because the primary device 108 may be the device from which the transfer will occur) and inactive in the secondary device 110. As another example, the user identity receipt module 312 may exist in both the primary and secondary devices 108, 110 but may be active in only the secondary device 110 (because the secondary device 110 may be device that receives the user identity information) and inactive in the primary device 108. Alternatively, less than all of the modules 302-312 may be included in each of the primary and secondary devices 108, 110, with only those modules to be used by a particular device being included in the particular device.

Figure 4A:
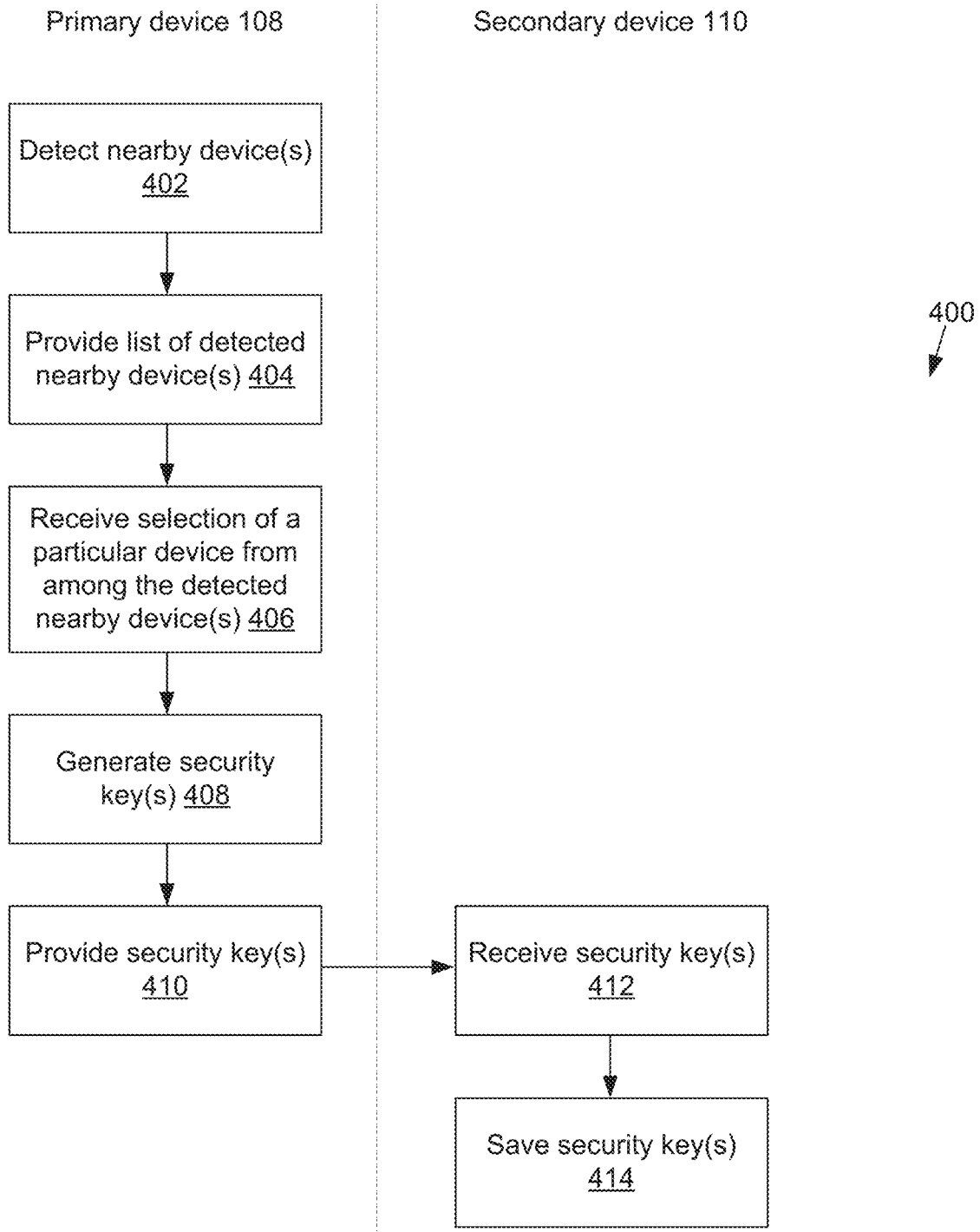
FIGS. 4A-4C depict example processes to practice the present disclosure, according to some embodiments.
Figure 4B:
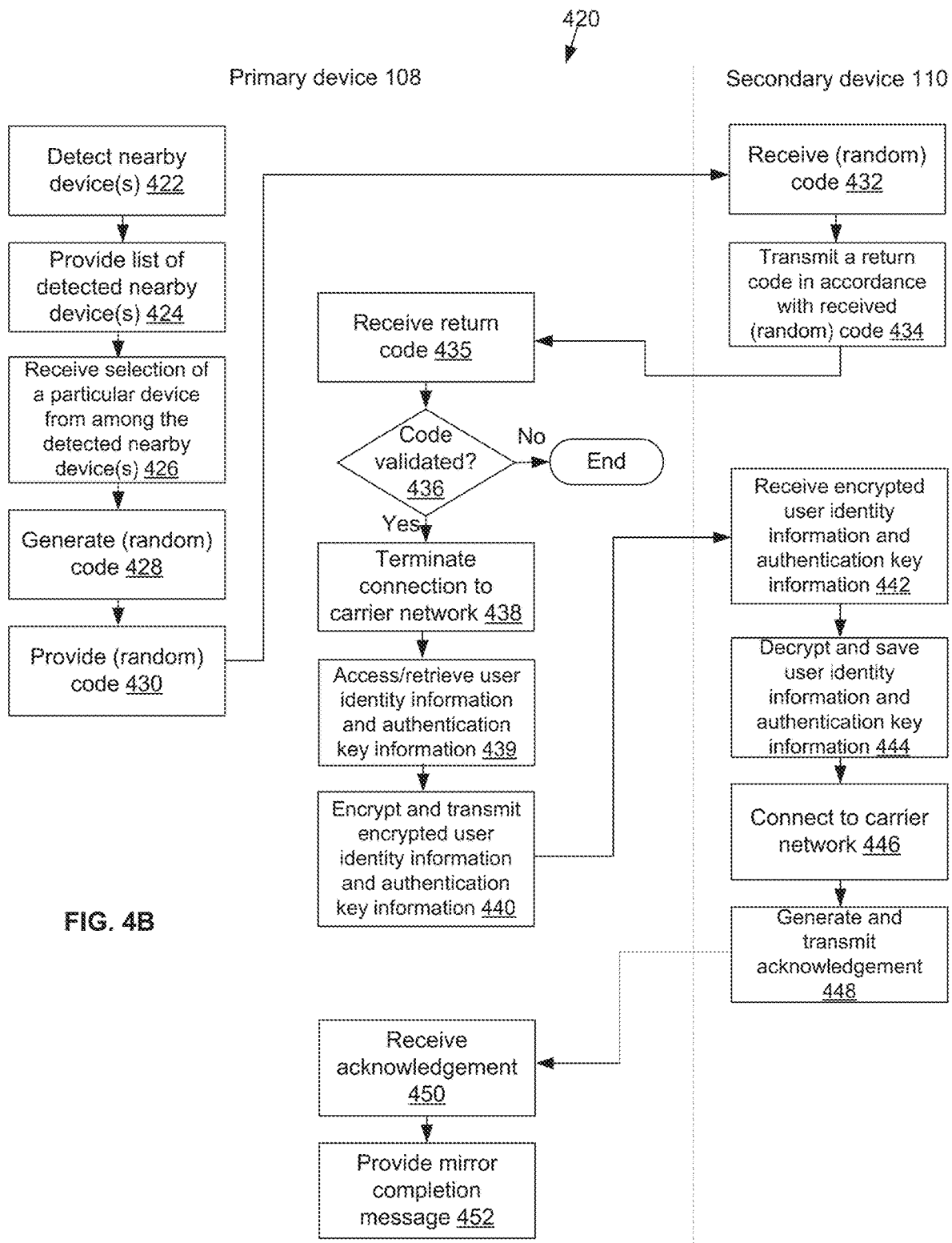
Figure 4C:
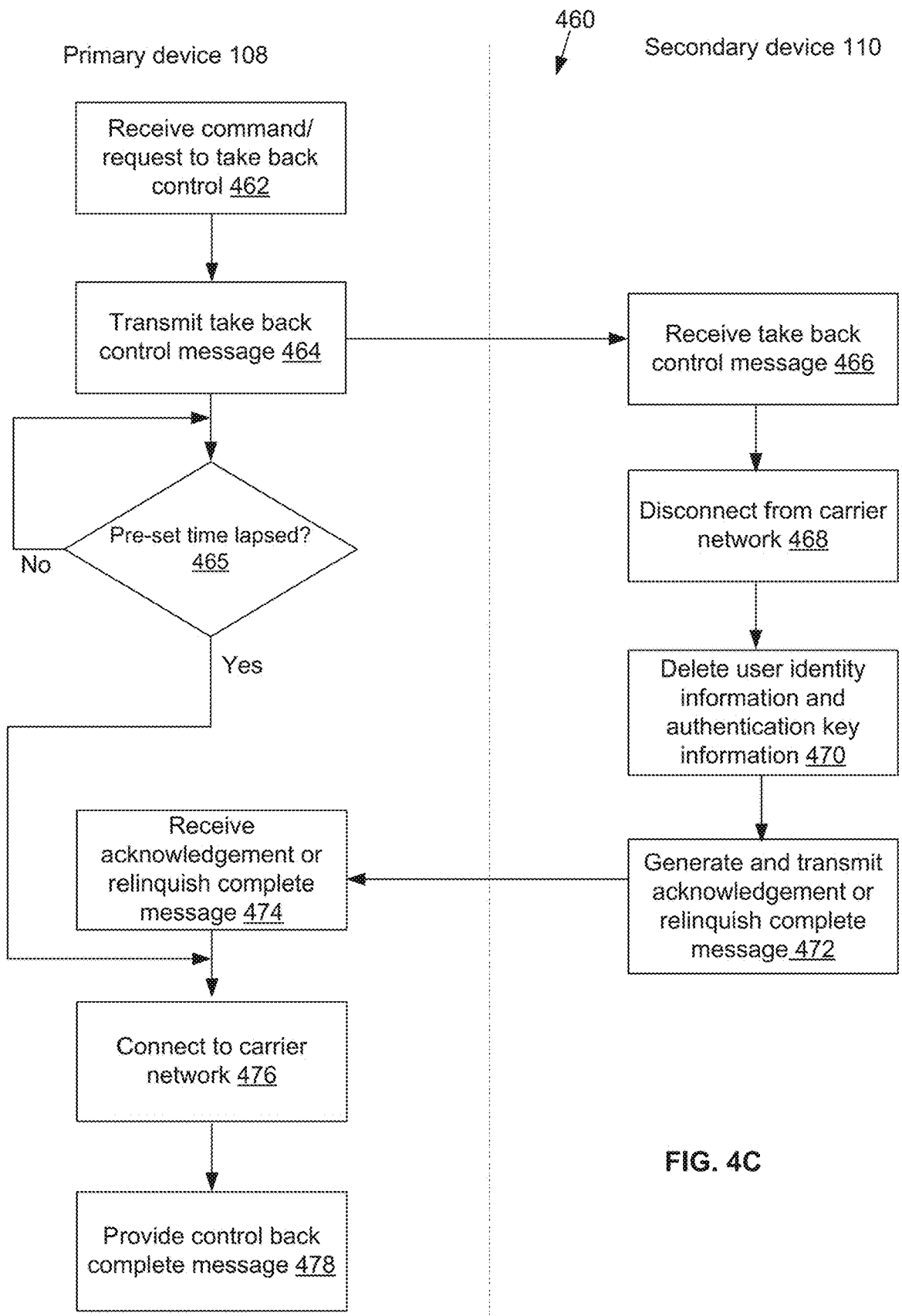
Figure 5:
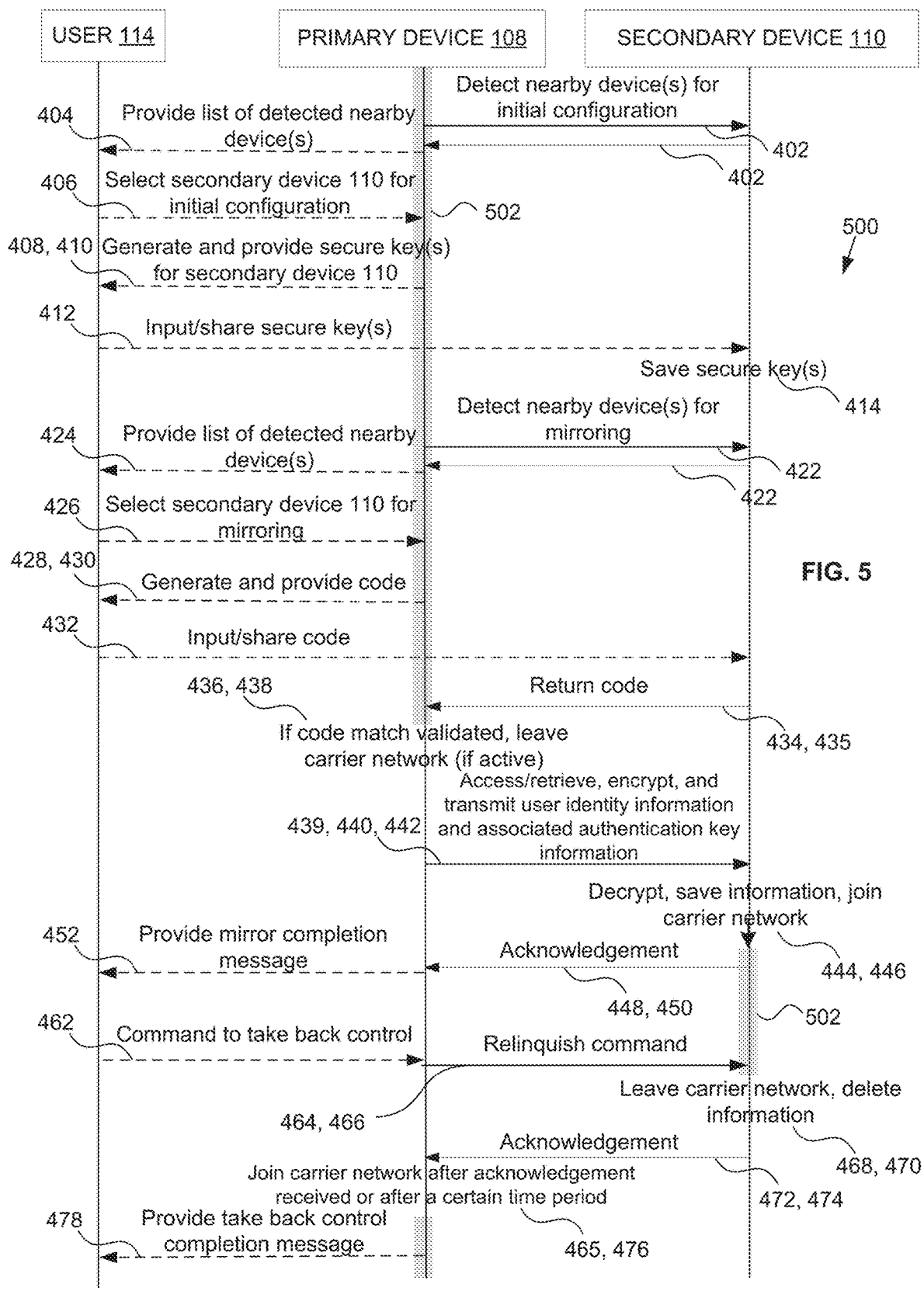
FIG. 5 depicts an example timing diagram relating to the processes of FIGS. 4A-4C, according to some embodiments.

FIGS. 4A-4C depict example processes that may be performed and/or facilitated by component 112 to securely share network carrier-related user identity information across more than one mobile device, under control of the user 114, and selectively access a carrier network by at most one of the mobile devices, from among a plurality of mobile devices, for telephony, data, and/or Internet communications using the network carrier-associated or related user identity information. Such processes may be accomplished, for example, without removal or cloning of a SIM card associated with the user identity information, without network carrier involvement, nor in violation of network carrier policy for user identity information usage, according to some embodiments. FIG. 5 depicts an example timing diagram 500 relating to the processes of FIGS. 4A-4C, according to some embodiments. FIGS. 4A-4C are described below in conjunction with FIG. 5. In some embodiments, the communications between the primary device 108 and secondary device 110 described below may occur via short range communication protocols such as, but not limited to, Bluetooth, infrared (IR), WiFi, near field communication (NFC), radio frequency identification (RFID), and the like.

FIG. 4A depicts an example process 400 to initially configure or pair a particular device (e.g., secondary device 110) with the primary device 108 to subsequently practice mirroring techniques, in accordance with some embodiments. In some embodiments, the initialization process may be initiated by the user 114 interfacing with the primary device 108. For example, the user 114 may open an app associated with the component 112 at the primary device 108. In response, at a block 402, the device detection module 302 included in the primary device 108 may detect and authenticate devices that are nearby or in proximity to the primary device 108. In some embodiments, detection may occur via a peer-to-peer exchange protocol such as, but not limited to, Bluetooth, IR, WiFi, NFC, or any communication protocol based on device physical proximity to each other. Near range proximity may be used to ensure that the device(s) on which mirroring may take place are all devices likely to be under control of and be physically accessible by the same user 114. Such consideration may be further taken into account as initiation progresses and as mirroring may be practiced, as described in detail below. In some embodiments, device detection module 302 may be configured to facilitate detection of nearby devices using conventional peer-to-peer communication protocols already included in the primary device 108. In other words, dedicated detection and authentication hardware, firmware, and/or software components may not be required, and instead, already existing components may be used.

Next, at block 404, user interface module 306 in conjunction with the device detection module 302 in the primary device 108 may provide a list of the detected nearby devices to be displayed on a display of the primary device 108. In some embodiments, if the initialization process or setup has already occurred for one or more devices of the detected devices, then those device(s) may be omitted from the displayed list since re-initialization may not be required.

In response to the displayed list of detected nearby devices, the user 114 may select, on the primary device 108, a particular device from among the displayed list, such as the secondary device 110. At block 406, the user interface module 306 of the primary device 108 may receive such selection.

At block 408, the initial pairing module 304 included in the primary device 108 may generate one or more security keys 320 (also referred to as secure keys, encryption-decryption keys, cryptographic keys, and the like) to be used between the primary device 108 and the selected particular device (e.g., secondary device 110) during the mirroring process. In some embodiments, the generated security keys 320 may be unique between the particular pair of the primary device 108 and the selected particular device, and each of the other devices that may be paired with the primary device 108 may have security keys different from each other. For example, one or more security keys 320 may comprise one or more symmetric cryptographic keys or the like.

Upon generation of the security keys 320, the user interface module 306 of the primary device 108 may provide to be displayed on the display of the primary device 108, at least a portion of the security keys 320 or some variation thereof that may permit proper encryption/decryption by the selected particular device, at block 410.

In some embodiments, the user 114 may view the security key(s) or code displayed on the primary device 108 and enter such security key(s) or code into the selected particular device (e.g., secondary device 110). For example, user 114 may enter the security key(s) or code using the user input(s) 208 of secondary device 110. Having the user 114 perform the "sharing" of the security key(s) or code between the primary and secondary devices 108, 110 may serve as a security check, since such "sharing" may not be possible if the user 114 does not have physical access to both devices at the same time. Moreover, by having the user 114 manually provide the security key(s) from the primary device 108 to the selected particular device, such security key(s) may be even more secure by not putting them on a network they may be intercepted. In response, the user interface module 306 included in the secondary device 110 may receive the entered security key(s) or code at block 412.

Next at block 414, the secondary device 110 may save the received security key(s) or code for later use.

Note that throughout the initiation process 400, the only device that may be connect to, have access to, and/or be active on the carrier network using the user identity information and authentication key associated with the ISIM included in the primary device 108 may be primary device 108 (as shown in a carrier network activity indicator 502 in FIG. 5).

FIG. 4B depicts an example (mirroring) process 420 to transfer network carrier-related user identity information and associated information to a particular device (e.g., secondary device 110) and mirror carrier network access on the particular device in place of the primary device 108, according to some embodiments. In some embodiments, blocks 422-426 may be similar to blocks 402-406 of FIG. 4A, except in block 424, the displayed list of detected nearby devices may comprise those devices from among the plurality of detected nearby devices for which initialization process or pairing (such as the process 400) have previously been completed.

At block 428, the user identity transfer module 308 included in the primary device 108 may generate one or more codes, such as a random code that may be, for example, four digits, for purposes of confirming that the selected particular device may currently be physically accessible and under control of the same user 114 also currently controlling the primary device 108. The user interface module 306 in conjunction with the user identity transfer module 308 included in the primary device 108 may provide the generated one or more codes to be displayed on the primary device 108, at block 430.

The user 114 may view the displayed one or more codes on the primary device 108 and enter or input the same code(s) into the selected particular device (e.g., via the user input(s) 208 of the secondary device 110). The user interface module 306 included in the secondary device 110 may receive the entered code(s) at block 432. Next, at block 434, the user identity receipt module 312 included in the secondary device 110 may generate and transmit a return code in accordance with the received code(s) to the primary device 108. In some embodiments, the return code may be the same as the received code(s). In other embodiments, the return code may be any code that may be evaluated by the primary device 108 to determine whether the return code was generated based on the code transmitted in block 430.

Back at the primary device 108, at block 435, the user identity transfer module 308 of the primary device 108 may receive the return code from the secondary device 110. Next at block 436, the user identity transfer module 308 of the primary device may determine whether the return code received in block 435 is a validated or valid code. In some embodiments, when the code generated in block 428 matches the return code received in block 435, a code validation may be deemed to have occurred. In other embodiments, when the return code received in block 435 satisfies a pre-determined criteria or characteristic or otherwise matches what the primary device 108 expects, then a code validation may be deemed to have occurred. If there is no code validation (no branch of block 436), then process 420 ends for security reasons because the secondary device 110 may not be under the user 114's control.

If there is code validation (yes branch of block 436), then a preliminary or first level security check has been satisfied—that of both the primary and secondary devices 108, 110 being in the user 114's possession and the user 114 being desirous of mirroring to the secondary device 110 at the current time. Thus, mirroring may continue and the active network control module 310 included in the primary device 108 may terminate its connection with the carrier network, if there is currently a session in progress with the carrier network, in block 438. Carrier networks may comprise long range wireless networks, cellular networks, mobile networks, radio networks, low power wide area networks (LPWA), and the like.

Next at block 439, the user identity transfer module 308 included in the primary device 108 may access and/or retrieve at least the user identity information and associated authentication key information from where they normally reside in the primary device 108. For example, they may be maintained in the ISIM included in the primary device 108.

In some embodiments, the user identity information and associated authentication key information to be encrypted in block 440 may comprise information copied from the ISIM (or equivalent) included in the primary device 108, in which the original user identity information and authentication key information may be information that is registered or activated with the carrier or service provider associated with the carrier network. The user identity information (also referred to as the network carrier associated user identity information 322) may comprise at least the IMSI number. The authentication key information (also referred to as the network carrier associated authentication key information 324) may comprise at least the authentication key $K_1$.

At block 440, the user identity transfer module 308 included in the primary device 108 may encrypt the copied information and transmit at least encrypted user identity information and associated authentication key information to the secondary device 110. In some embodiments, the information transmitted to the secondary device 110 may also include additional information such as, but not limited to, one or more of a portion of or whole address book information, call history, text history, and the like. Note that the ISIM (or equivalent) included in the primary card 108, and its content, remains as is in the primary card 108. Only a (minimal) portion of the network carrier-related information may be mirrored (e.g., IMSI number and authentication key $K_1$) in a particular another device selected by the user 114, e.g., the secondary device 110, sufficient for network carrier-based communications to continue at the secondary device 110 in a seamless handed over manner.

In some embodiments, the user identity transfer module 308 may encrypt the user identity information, associated authentication key information, and other possible information to be transmitted using the particular security key(s) 320 shared between the primary device 108 and secondary device 110 during the initialization or pairing set up performed in the process 400.

In response, the user identity receipt module 312 included in the secondary device 110 may receive the encrypted user identity information and authentication key information (and other possible information) from the primary device 108, at block 442. Next, at block 444, the user identity receipt module 312 at the secondary device 110 may decrypt and save the received information (e.g., in memory 206 or other component(s) 212). Decryption may be performed using the particular security key(s) 320 received from the primary device 108 and which was previously stored in the secondary device 110.

Now in possession of at least the same user identity information and associated authentication key information normally associated with the primary device 108, the active network control module 310 included in the secondary device 110 may connect to or start a session with the same carrier network that the primary device 108 was previously connected with, using the locally stored user identity information and associated authentication key information, at block 446. The secondary device 110 may now carry out carrier network-based communications that were previously carried out on the primary device 108, with recipients of such communications unable to detect a change in a phone number or user identifier, for example. For instance, phone calls, texts, and other carrier network-based communications associated with the phone number of primary device 108 may continue on the secondary device 110. Since only the secondary device 110 is active on the carrier network at this point in time for the particular user identity information, which conforms to the carrier policy, rule, or requirement of only one device at a time using a particular user identity information, the carrier need not be informed of the mirroring. For example, it may merely appear to the carrier network as if the user 114 physically moved a SIM card from the primary device 108 to the secondary device 110.

With mirroring or handover complete, at block 448, the user identity receipt module 312 included in the secondary device 110 may generate and transmit an acknowledgement or mirror completion message to the primary device 108. Such message may be received by the primary device 108, at block 450. And in response, the user interface module 306 of the primary device 108 may provide a message to be displayed on the primary device 108 to confirm to the user 114 that mirroring or handover to the secondary device 110 is complete.

From this point onward, the user 114 may use the secondary device 110, instead of the primary device 108, for carrier network-based communications. Secondary device 110 may continue in this capacity until the user 114 requests handover back to the primary device 108. FIG. 4C depicts an example process 460 to return carrier network-based communication functionality back to the primary device 108 in response to user 114 command, according to some embodiments.

At block 462, the user interface module 306 of the primary device 108 may receive a command or request from the user 114 to take back or return control of at least the carrier network-based communications to be carried out from the primary device 108. In response, the network identity transfer module 308 included in the primary device 108 may transmit a take back control message or relinquish message to the secondary device 110, at block 464.

The transmitted message of block 464 may be received by the user identity receipt module 312 included in the secondary device 110, at block 466. In response to the received message, the active network control module 310 included in the secondary device 110 may cause the secondary device 110 to disconnect from the carrier network, at block 468. In addition, at block 470, the user identity receipt module 312 of the secondary device 110 may delete the locally stored user identity information, authentication key information, and other possible information previously sent from the primary device 108 for mirroring purposes. Then at block 472, the user identity receipt module 312 of the secondary device 110 may generate and transmit an acknowledgement or relinquish complete message to the primary device 108.

Upon receipt of the acknowledgement or relinquish complete message sent by the secondary device 110 at the primary device 108, at block 474, primary device 108 may resume carrier network-based communications by (re)connecting to the carrier network (block 476) and providing a relinquish or control back complete message to be displayed for the user 114 (block 478).

In some embodiments, the primary device 108 may be enabled with an override capability so that the carrier network-based communications can occur again from the primary device 108 even if the secondary device 110 fails to respond to the take back control/relinquish message. For example, if the secondary device 110 may be lost, stolen, damaged, battery is too low, out of range, or otherwise unable to respond to the take back control/relinquish message, then the primary device 108 may reconnect with the carrier network, even if the secondary device 110 may still be connected to the carrier network. In alternative embodiments, rather than implementing the override capability, the user 114 may contact the carrier and request the user identity to be disabled or invalidated if the user 114 knows that the secondary device 110 continues to be connected to the carrier network but may, for example, be lost to the user 114.

After the take back control message transmission at block 464, the active network control module 310 included in the primary device 108 may wait for a pre-set time period during which a response from the secondary device 110 may be expected and/or blocks 466-472 may reasonably be performed. If the pre-set time period has lapsed (yes branch of block 465), then process 460 may proceed to block 476 to perform an override regardless of whether or not the secondary device 110 has disconnected from the carrier network. If the pre-set time period has not lapsed (no branch of block 465), then the active network control module 310 in the primary device 108 may wait in case relinquishment by the secondary device 110 may be in progress. Connecting the primary device 108 to the carrier network while the secondary device 110 may already be connected to the same carrier network using the same user identity information may be a last resort scenario because the carrier or service provider associated with the carrier network may consider more than one device accessing the carrier network using the same user identity information as a cloned device that is unauthorized and cause for the account associated with the user identity information to be disabled.

In this manner, a device, such as the secondary device 110, may be configured to serve a specific need at a lower cost, smaller form factor, more robust, and the like than a smart phone or tablet. A user having two or more communication devices may wish to be accessible on different devices at different times using the same carrier network identity. For example, when the user may be kayaking, the user may prefer a communication device that may be waterproof, robust, and potentially hands-free rather than a smart phone. As another example, when the user may be jogging, the user may prefer a communication device that may be small, robust, and potentially waterproof. As still another example, when clubbing, the user may prefer having a communication device that may be small since pockets or bags may be small or non-existent.

In some embodiments, the secondary device 110 may include features or capabilities such as, but not limited to: small size or form factor; robustness; low cost; voice calls, text, and, optionally, minimal address book functionalities; communication capability for proximate device detection and data transfer/communication with the primary device 108; runs mobile operating system supporting apps; cryptography capability for secure data transfer/communication; simple user input mechanism(s) to facilitate hands-free, limited hand mobility (e.g., gloves), etc.; and the like. In some embodiments, component 112 may also include features to synchronize the address book, call history, text history, or the like upon return of control back to the primary device 108; provide location services on the secondary device 110; and the like.

The present disclosure provides mirroring carrier network communication functionalities conventionally performed on the primary device 108 at a device from among a plurality of devices different from the primary device 108 without, for example, physically transferring the SIM card included in the primary device 108 to another device, without using another user identity associated with the carrier network (e.g., having two accounts associated with different phone numbers), without cloning the ISIM included in the primary device 108, without carrier network involvement, and/or without having more than one device accessing the carrier network using the same user identity information at the same time (which may be blocked by the carrier to avoid fraud or misrouting of calls/texts). The mirroring may be performed under user control and may be initiated only from the primary device 108. The transfer or sharing of the user identity information associated with the SIM card at the primary device 108 may be securely performed and under full control of the user at each stage of the processes. Because of the particular manner in which the user identity information (and associated information) may be transferred and handled by the receiving device, such information may be securely used by the receiving device. And the present disclosure ensures that only one device using a given user identity information may be active on the carrier network at any given time.

Figure 6:
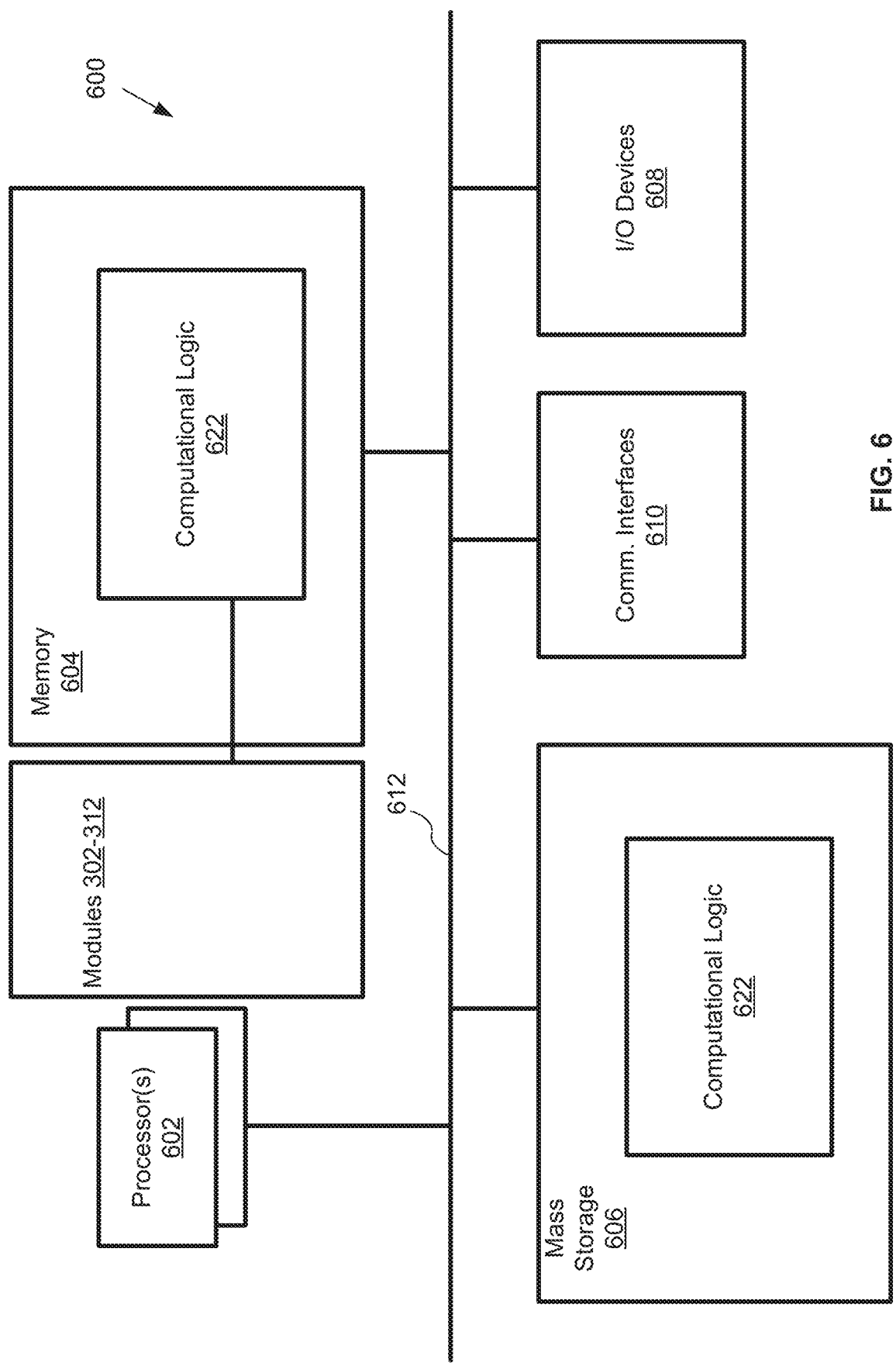
FIG. 6 illustrates an example computer device suitable for use to practice aspects of the present disclosure, according to some embodiments.

FIG. 6 illustrates an example computer device 600 suitable for use to practice aspects of the present disclosure, in accordance with various embodiments. In some embodiments, computer device 600 may comprise any of the server 104, database 104, primary device 108, and/or secondary device 110. As shown, computer device 600 may include one or more processors 602, and system memory 604. The processor 602 may include any type of processors. The processor 602 may be implemented as an integrated circuit having a single core or multi-cores, e.g., a multi-core microprocessor. The computer device 600 may include mass storage devices 606 (such as diskette, hard drive, volatile memory (e.g., DRAM), compact disc read only memory (CD-ROM), digital versatile disk (DVD), flash memory, solid state memory, and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computer device 600 may further include input/output (I/O) devices 608 (such as a display 602), keyboard, cursor control, remote control, gaming controller, image capture device, and so forth and communication interfaces 610 (such as network interface cards, modems, infrared receivers, radio receivers (e.g., Bluetooth)), and so forth.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computer device 600 elements may be coupled to each other via a system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations associated with system 100, e.g., operations associated with providing one or more of modules 302-312 as described above, generally shown as computational logic 622. Computational logic 622 may be implemented by assembler instructions supported by processor(s) 602 or high-level languages that may be compiled into such instructions. The permanent copy of the programming instructions may be placed into mass storage devices 606 in the factory, or in the field, through, for example, a distribution medium (not shown), such as a compact disc (CD), or through communication interfaces 610 (from a distribution server (not shown)).

In some embodiments, one or more of modules 302-312, e.g., device detection module 302, initial pairing module 304, and so forth, may be implemented in hardware integrated with, e.g., communication interface 610. In other embodiments, one or more of modules 302-312, e.g., user identity module 308 and so forth, may be implemented in hardware integrated with, e.g., processor 602.

FIG. 7 illustrates an example non-transitory computer-readable storage media 702 having instructions configured to practice all or selected ones of the operations associated with the processes described above. As illustrated, non-transitory computer-readable storage medium 702 may include a number of programming instructions 704 (e.g., one or more of modules 302-312). Programming instructions 704 may be configured to enable a device, e.g., computer device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 804 may be encoded in transitory computer-readable signals.

Referring again to FIG. 6, the number, capability, and/or capacity of the elements 608, 610, 612 may vary, depending on whether computer device 600 is used as a stationary computing device, such as a set-top box or desktop computer, or a mobile computing device, such as a tablet computing device, laptop computer, game console, an Internet of Things (IoT), or smartphone. Their constitutions are otherwise known, and accordingly will not be further described.

At least one of processors 602 may be packaged together with memory having computational logic 622 (or portion thereof) configured to practice aspects of embodiments described in reference to FIGS. 1-5. For example, computational logic 622 may be configured to include or access one or more of modules 302-312. In some embodiments, at least one of the processors 602 (or portion thereof) may be packaged together with memory having computational logic 622 configured to practice aspects of processes 300, 500 to form a System in Package (SiP) or a System on Chip (SoC).

In various implementations, the computer device 600 may comprise a laptop, a netbook, a notebook, an ultrabook, a smartphone, a tablet, an Internet of Things (IoT) device, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computer device 600 may be any other electronic device that processes data.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

Examples of the devices, systems, and/or methods of various embodiments are provided below. An embodiment of the devices, systems, and/or methods may include any one or more, and any combination of, the examples described below.

Example 1 is an apparatus including one or more communication sub-systems; and an identity mirror component in communication with the one or more communication sub-systems, wherein the identity mirror component is to: in response to selection, on an another device, of the apparatus from among a plurality of devices, receive, from the another device, carrier user identity information and carrier authentication key information associated with the carrier user identity information; and cause the one or more communication sub-systems to connect to a carrier network using the carrier user identity information and the carrier authentication key information, wherein to connect to the carrier network is conditioned on the another device being disconnected from the carrier network and the another device is to retain the carrier user identity information and the carrier authentication key information in an Internet protocol (IP) multimedia services identity module (ISIM).

Example 2 may include the subject matter of Example 1, and may further include wherein the identity mirror component is to further receive, from a user, a code generated by and displayed on the another device, and to further transmit, to the another device, a return code based on the code.

Example 3 may include the subject matter of any of Examples 1-2, and may further include wherein to receive the carrier user identity information and the carrier authentication key information requires a determination of validation of the return code by the another device.

Example 4 may include the subject matter of any of Examples 1-3, and may further include wherein the one or more communication sub-systems includes a short range wireless communication sub-system to receive the carrier user identity information and the carrier authentication key information and a long range wireless communication sub-system to connect to the carrier network.

Example 5 may include the subject matter of any of Examples 1-4, and may further include wherein the short range wireless communication sub-system includes one or more of Bluetooth, infrared (IR), WiFi, near field communication (NFC), or radio frequency identification (RF ID).

Example 6 may include the subject matter of any of Examples 1-5, and may further include wherein the identity mirror component is to further receive, from the another device, a message to relinquish use of the carrier user identity information, wherein the message to relinquish is initiated by a user interfacing with the another device.

Example 7 may include the subject matter of any of Examples 1-6, and may further include wherein the one or more communication sub-systems, in response to the received message to relinquish, is to disconnect from the carrier network and the identity mirror component is to delete storage of the carrier user identity information and the carrier authentication key information.

Example 8 may include the subject matter of any of Examples 1-7, and may further include wherein the carrier network comprises a long range wireless network, a cellular network, a mobile network, a radio network, or a low power wide area network (LPWA).

Example 9 may include the subject matter of any of Examples 1-8, and may further include wherein the apparatus comprises a mobile communication device having a smaller size, smaller form factor, lower manufacturing cost, fewer components, fewer features, or different features than the another device.

Example 10 may include the subject matter of any of Examples 1-9, and may further include one or more processors, and wherein the identity mirror component comprises one or more instructions to be executed by the one or more processors.

Example 11 may include the subject matter of any of Examples 1-10, and may further include wherein the one or more instructions are one or both of stored and executed in a trusted execution environment (TEE).

Example 12 may include the subject matter of any of Examples 1-11, and may further include wherein the TEE is included in a dedicated core.

Example 13 may include the subject matter of any of Examples 1-12, and may further include wherein the received carrier user identity information and the received carrier authentication key information are in an encrypted format, wherein the identity mirror component is to decrypt the received carrier user identity information and the received carrier authentication key information using one or more security keys previously provided by the another device, wherein the one or more communication sub-systems is to connect to the carrier network using the received carrier user identity information and the received carrier authentication key information decrypted using the one or more security keys.

Example 14 is a computerized method including, in response to a user request to initiate device mirroring, providing a list of nearby devices; receiving a selection by the user of a particular device from the list; in response to the selection by the user, generating and transmitting a first code to the particular device; when a second code received from the particular device is valid, terminating connection with a long range communication network; and sharing at least a portion of the information included in an Internet protocol (IP) multimedia services identity module (ISIM) with the particular device, wherein the particular device is to connect to the long range communication network using the at least a portion of the information.

Example 15 may include the subject matter of Example 14, and may further include wherein transmitting the first code to the particular device comprises transmitting the first code using a short range communication protocol.

Example 16 may include the subject matter of any of Examples 14-15, and may further include wherein the short range communication protocol comprises Bluetooth, infrared (IR), WiFi, near field communication (NFC), or radio frequency identification (RFID).

Example 17 may include the subject matter of any of Examples 14-16, and may further include, prior to providing the list of nearby devices, detecting the nearby devices using a short range communication protocol.

Example 18 may include the subject matter of any of Examples 14-17, and may further include, prior to sharing the at least a portion of the information, retrieving the at least a portion of the information from the ISIM and encrypting the at least a portion of the information, and wherein sharing the at least a portion of the information comprises sharing an encrypted version of the at least a portion of the information.

Example 19 may include the subject matter of any of Examples 14-18, and may further include wherein the list of nearby devices comprises only devices which had previously been provided one or more security keys for device mirroring.

Example 20 may include the subject matter of any of Examples 14-19, and may further include generating the encrypted version of the at least a portion of the information using the one or more security keys.

Example 21 may include the subject matter of any of Examples 14-20, and may further include wherein the one or more security keys comprise symmetric cryptographic keys.

Example 22 may include the subject matter of any of Examples 14-21, and may further include wherein the at least a portion of the information comprises user identity information and authentication key information associated with the user identity information, wherein the user identity information and the authentication key information comprise credentials to connect with the long range communication network.

Example 23 may include the subject matter of any of Examples 14-22, and may further include wherein the long range communication network comprises a wireless network, a cellular network, a mobile network, a radio network, or a low power wide area network (LPWA).

Example 24 may include the subject matter of any of Examples 14-23, and may further include maintaining no connection with the long range communication network while the particular device is connected to the long range communication network.

Example 25 is a first device including a short range communication sub-system and a long range communication sub-system; an Internet protocol (IP) multimedia services identity module (ISIM) storing at least user identity information and authentication key information associated with a long range communication network; and an identity mirror component in communication with the short and long range communication sub-systems and the ISIM, wherein the identity mirror component is to: in response to a request by a user on the first device to have long range communication capabilities at a second device, cause the long range communication sub-system to terminate connection with the long range communication network; and cause the short range communication sub-system to provide at least the user identity information and the authentication key information to the second device upon satisfaction of one or more security checks between the first and second devices, wherein the second device is to connect to the long range communication network using the user identity information and the authentication key information that have been provided.

Example 26 may include the subject matter of Example 25, and may further include wherein the identity mirror component is further to: retrieve the user identity information and the authentication key information from the ISIM; encrypt the retrieved user identity information and authentication key information in accordance with one or more security keys already known between the first and second devices; and wherein to cause the short range communication sub-system to provide at least the user identity information and the authentication key information to the second device comprises to cause the encrypted user identity information and the authentication key information to be provided to the second device.

Example 27 may include the subject matter of any of Examples 25-26, and may further include a subscriber identity module (SIM) card, SIM circuitry, SIM chip, universal integrated circuit card (UICC), UICC circuitry, UICC chip, universal subscriber identity module (USIM), USIM card, USIM circuitry, or USIM chip, and wherein the ISIM is included in one of the SIM card, SIM circuitry, SIM chip, UICC, UICC circuitry, UICC chip, USIM, USIM card, USIM circuity, or USIM chip.

Example 28 may include the subject matter of any of Examples 25-27, and may further include wherein the identity mirror component is further to: in response to another request by the user on the first device, cause the short range communication sub-system to transmit a control message to the second device, wherein the control message comprises a command for the second device to disconnect from the long range communication network and delete the user identity information and the authentication key information on the second device.

Example 29 may include the subject matter of any of Examples 25-28, and may further include wherein the identity mirror component is further to: receive an acknowledgement, from the second device, of disconnection and deletion that have occurred; and in response to receipt of the acknowledgement, cause the long range communication sub-system to reconnect to the long range communication network using the user identity information and the authentication key information.

Example 30 may include the subject matter of any of Examples 25-29, and may further include wherein the identity mirror component is further to: detect a pre-set time period after which the control message is transmitted, in which no response is returned by the second device; and cause the long range communication sub-system to reconnect to the long range communication network using the user identity information and the authentication key information.

Example 31 may include the subject matter of any of Examples 25-30, and may further include wherein the long range communication network comprises a wireless network, a cellular network, a mobile network, a radio network, or a low power wide area network (LPWA).

Example 32 may include the subject matter of any of Examples 25-31, and may further include wherein the short range wireless communication sub-system includes one or more of Bluetooth, infrared (IR), WiFi, near field communication (NFC), or radio frequency identification (RFID) sub-system.

Example 33 is one or more computer-readable storage medium comprising a plurality of instructions to cause an apparatus, in response to execution by one or more processors of the apparatus, to including receive one or more security keys generated by a device; receive, from the device, user identity information and authentication key information associated with the user identity information; and connect to a carrier network using the user identity information and the authentication key information, wherein to connect to the carrier network is conditioned on the device being disconnected from the carrier network and the device is to retain the user identity information and the authentication key information in an Internet protocol (IP) multimedia services identity module (ISIM).

Example 34 may include the subject matter of Example 33, and may further include wherein the plurality of instructions, in response to execution by the one or more processors of the apparatus, further cause to receive, from a user, a code generated by and displayed on the device, and to further transmit, to the device, a return code based on the code.

Example 35 may include the subject matter of any of Examples 33-34, and may further include wherein to receive the user identity information and the authentication key information requires a determination of validation of the return code by the device.

Example 36 may include the subject matter of any of Examples 33-35, and may further include wherein the user identity information and the authentication key information are received via a short range wireless communication protocol, and the carrier network comprises a long range wireless communication network.

Example 37 may include the subject matter of any of Examples 33-36, and may further include wherein the user identity information and the authentication key information are received in an encrypted format, and wherein the plurality of instructions, in response to execution by the one or more processors of the apparatus, further cause to decrypt the user identity information and the authentication key information in the encrypted format using the one or more security keys.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

We claim:

1. An apparatus comprising:
   a plurality of communication sub-systems including a short range communication sub-system and a long range communication sub-system; and
   an identity mirror component in communication with the plurality of communication sub-systems, wherein the identity mirror component is to:
   receive, from a communication device, via the short range communication subsystem, carrier user identity information and carrier authentication key information associated with the carrier user identity information, the carrier user identity information and carrier authentication key information being provided from the communication device to the apparatus in response to a selection of the apparatus from among one or more apparatuses presented on the communication device, made on the communication device, the communication device also having another short range communication sub-system, another long range communication sub-system, an Internet Protocol (IP) Multimedia Services Identity Module (ISIM) storing and retraining the carrier user identity information and the carrier authentication key information, and being recognized by a carrier network as a primary communication device, and the one or more apparatuses being recognized by the carrier network as second communication device or devices affiliated with the primary communication device, wherein the communication device provides the carrier user identity information and the carrier authentication key information via the other short range communication sub-system upon satisfaction of one or more security checks between the communication device and the apparatus, and termination of the other long range communication subsystem to the carrier network; and
   cause the long range communication sub-systems to connect to the carrier network using the carrier user identity information and the carrier authentication key information provided;
   wherein the communication device is to further cause the other short range communication sub-system, in response to a user of the communication device to transmit a control message to the apparatus, the control message having a command for the apparatus to disconnect from the carrier network and delete the carrier user identity information and the carrier authentication key information, and on detecting a pre-set time period after which the control message is transmitted, in which no response is returned by the apparatus, causing the other long range communication sub-system to reconnect to the carrier network using the carrier user identity information and the carrier authentication key information.

2. The apparatus of claim 1, wherein the identity mirror component is to further receive, from a user, a code generated by and displayed on the primary communication device, and to further transmit, to the primary communication device, a return code based on the code.

3. The apparatus of claim 2, wherein to receive the carrier user identity information and the carrier authentication key information requires a determination of validation of the return code by the primary communication device.

4. The apparatus of claim 1, wherein the identity mirror component is to further receive, from the primary communication device, a message to relinquish use of the carrier user identity information, wherein the message to relinquish is initiated by a user interfacing with the primary communication device.

5. The apparatus of claim 4, wherein the one or more communication sub-systems, in response to the received message to relinquish, is to disconnect from the carrier network and the identity mirror component is to delete storage of the carrier user identity information and the carrier authentication key information.

6. The apparatus of claim 1, further comprising one or more processor cores, and wherein the identity mirror component comprises one or more instructions to be executed by the one or more processor cores.

7. The apparatus of claim 6, wherein the one or more instructions are one or both of stored and executed in Trusted Execution Environment (TEE).

8. The apparatus of claim 7, wherein the TEE is included in a dedicated one of the processor cores.

9. A first device comprising:
   a short range communication sub-system and a long range communication sub-system;
   an Internet Protocol (IP) Multimedia Services Identity Module (ISIM) storing at least user identity information and authentication key information associated with a long range communication network; and
   an identity mirror component in communication with the short and long range communication sub-systems and the ISIM, wherein the identity mirror component is to:
   in response to a request by a user on the first device to have long range communication capabilities at a second device, cause the long range communication sub-system to terminate connection with the long range communication network; and
   cause the short range communication sub-system to provide at least the user identity information and the authentication key information to the second device upon satisfaction of one or more security checks between the first and second devices, wherein the second device is to connect to the long range communication network using the user identity information and the authentication key information that have been provided;
   wherein the identity mirror component is further to:

in response to another request by the user on the first device, cause the short range communication subsystem to transmit a control message to the second device, the control message having a command for the second device to disconnect from the long range communication network and delete the user identity information and the authentication key information on the second device;

detect a pre-set time period after which the control message is transmitted, in which no response is returned by the second device; and cause the long range communication sub-system to reconnect to the long range communication network using the user identity information and the authentication key information.

10. The first device of claim 9, further comprising a Subscriber Identity Module (SIM) card, SIM circuitry, SIM chip, Universal Integrated Circuit Card (UICC), UICC circuitry, UICC chip, Universal Subscriber Identity Module (USIM), USIM card, USIM circuitry, or USIM chip, and wherein the ISIM is included in one of the SIM card, SIM circuitry, SIM chip, UICC, UICC circuitry, UICC chip, USIM, USIM card, USIM circuitry, or USIM chip.

11. The first device of claim 9, wherein the identity mirror component is further to:

receive an acknowledgement, from the second device, of disconnection and deletion that have occurred; and in response to receipt of the acknowledgement, cause the long range communication sub-system to reconnect to the long range communication network using the user identity information and the authentication key information.

12. The first device of claim 9, wherein the short range communication sub-system includes one or more of BLUETOOTH, Infrared (IR), WIFI, Near Field Communication (NFC), or Radio Frequency Identification (RFID) sub-system.

* * * * *